US011309675B2

(12) United States Patent
Feubli

(10) Patent No.: US 11,309,675 B2
(45) Date of Patent: Apr. 19, 2022

(54) CABLE PROCESSING DEVICE

(71) Applicant: komax Holding AG, Dierikon (CH)

(72) Inventor: Dominik Feubli, Kriens (CH)

(73) Assignee: komax Holding AG, Dierikon (CH)

(*) Notice: Subject to any disclaimer, the term of this patent is extended or adjusted under 35 U.S.C. 154(b) by 159 days.

(21) Appl. No.: 16/592,954

(22) Filed: Oct. 4, 2019

(65) Prior Publication Data

US 2020/0144780 A1    May 7, 2020

(30) Foreign Application Priority Data

Nov. 2, 2018 (EP) .................................... 18204135

(51) Int. Cl.
H01R 43/052 (2006.01)
H01R 43/28 (2006.01)

(52) U.S. Cl.
CPC ........... *H01R 43/052* (2013.01); *H01R 43/28* (2013.01)

(58) Field of Classification Search
CPC ..... H01R 43/052; H01R 43/28; H02G 1/1248
See application file for complete search history.

(56) References Cited

U.S. PATENT DOCUMENTS

| 5,816,384 | A | 10/1998 | Hsu | |
| 7,043,825 | B2* | 5/2006 | Conte | B25J 9/041 29/33 F |
| 7,637,005 | B2* | 12/2009 | Lustenberger | H01R 43/048 29/33 F |
| 9,475,669 | B2* | 10/2016 | Schutz | H01R 43/052 |
| 10,840,663 | B2* | 11/2020 | Staubli | H01R 43/05 |
| 2020/0144780 | A1* | 5/2020 | Feubli | H01R 43/052 |

FOREIGN PATENT DOCUMENTS

DE          197 35 655 A1   3/1999
DE    10 2013 112 118 A1   5/2015

OTHER PUBLICATIONS

Final European Search Report dated Aug. 20, 2019 in European Application No. 18204135.0 with English translation of relevant parts.

* cited by examiner

*Primary Examiner* — Minh N Trinh

(74) *Attorney, Agent, or Firm* — Collard & Roe, P.C.

(57) ABSTRACT

A cable processing device includes at least one processing unit for assembling a cable and a sorting unit that can be actuated with a selection signal to output a cable received from the processing unit at least on a first side or on a second side according to the selection signal.

9 Claims, 5 Drawing Sheets

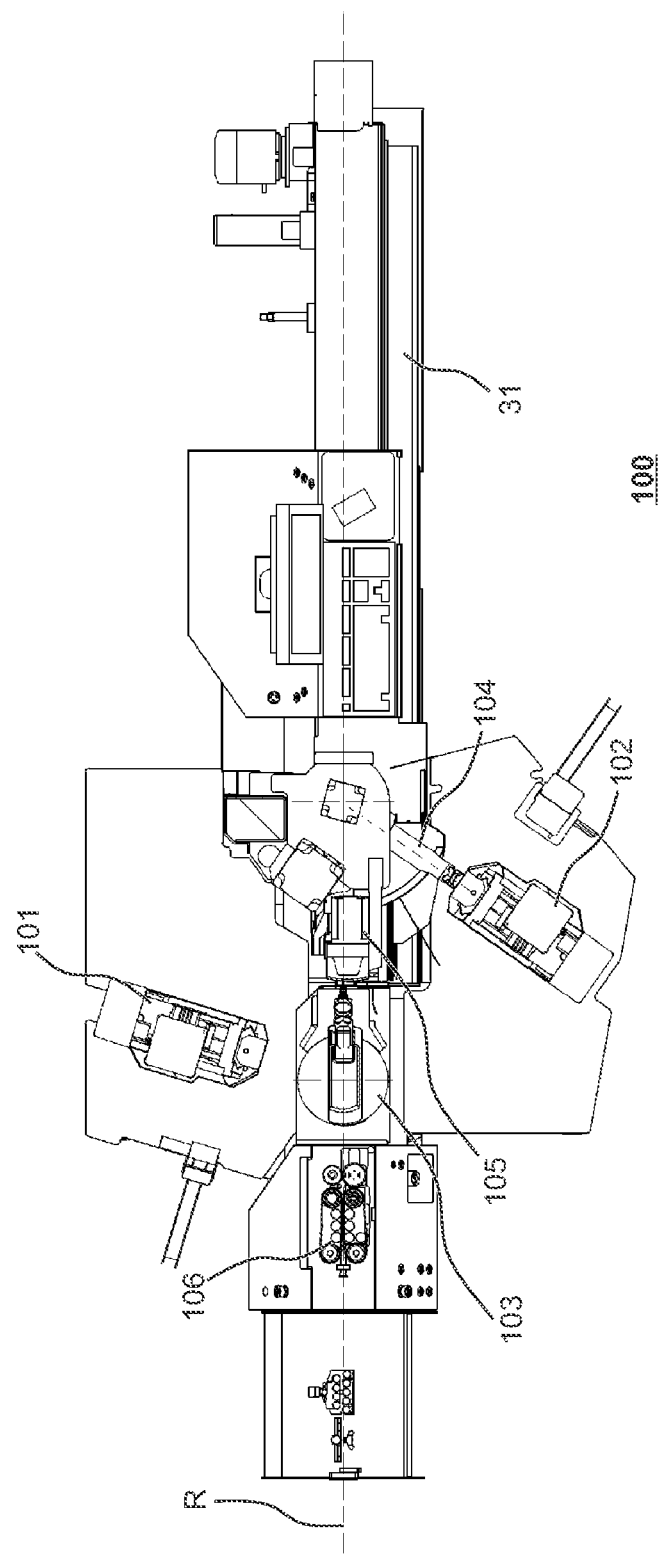

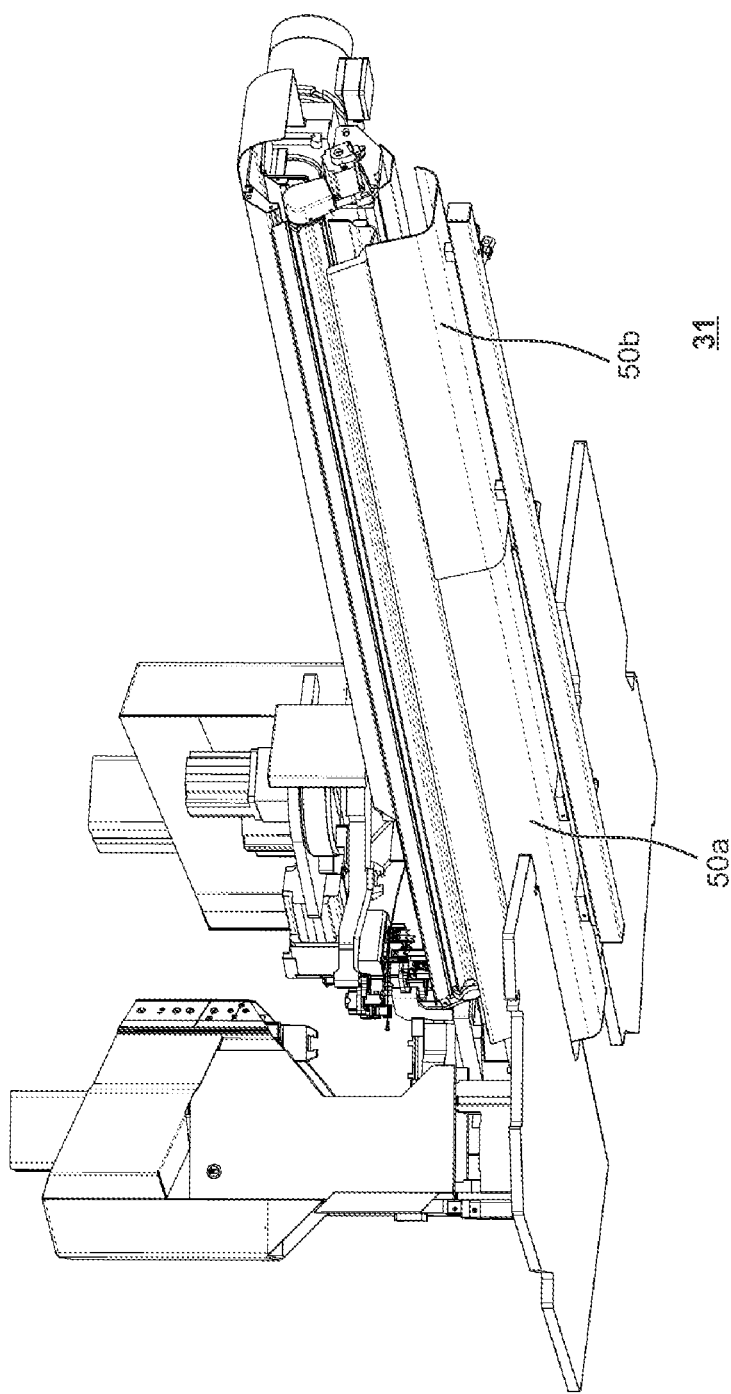

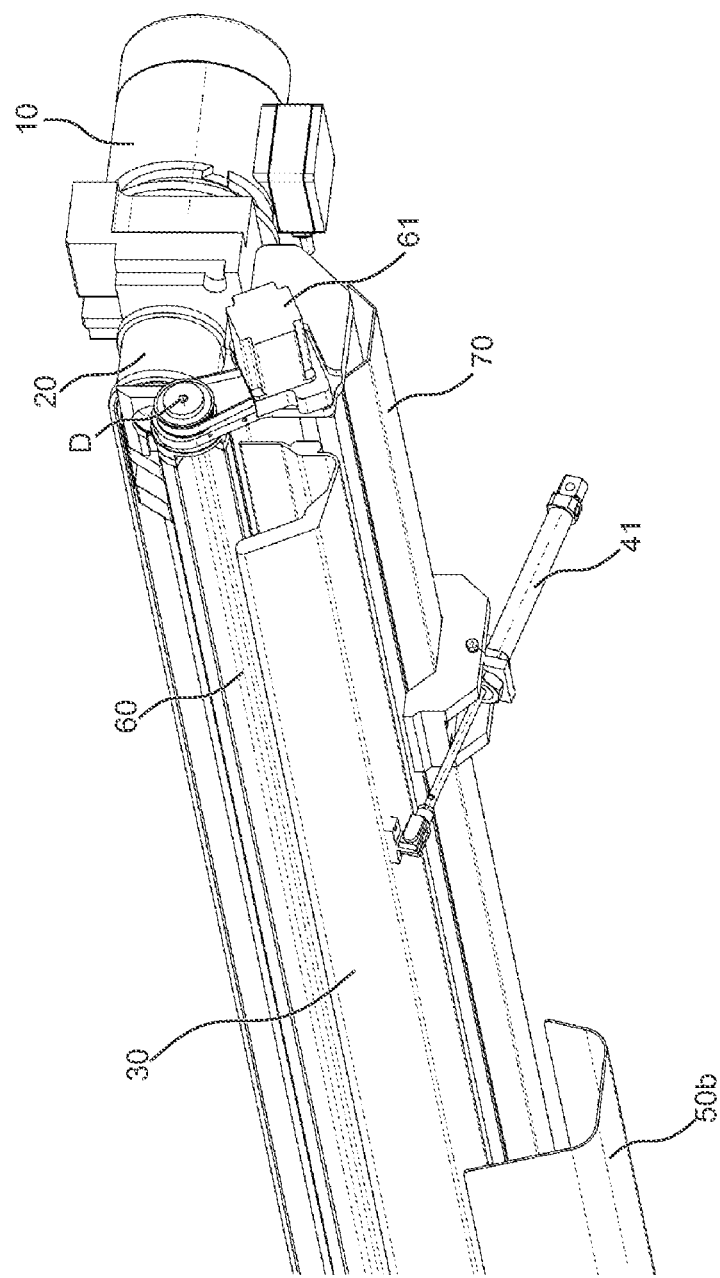

CABLE PROCESSING DEVICE

CROSS REFERENCE TO RELATED APPLICATIONS

Applicant claims priority under 35 U.S.C. § 119 of European Application No. 18204135.0 filed Nov. 2, 2018, the disclosure of which is incorporated by reference.

BACKGROUND OF THE INVENTION

1. Field of the Invention

The present disclosure relates to a cable processing device, which outputs one cable or a plurality of cables for removal after a completed assembly process.

2. Description of the Related Art

Cable processing devices are usually equipped with a cable tray, for example which is designed in the form of a cable trough or removal trough. The cable processing device typically produces a plurality of cables, which together comprise a cable batch (cable assembly). For example, a specific number of similarly produced cables or respective similarly assembled groups of cables forms a cable batch.

Various process steps or assembly steps for a cable to be assembled, e.g., a stripping step, a crimping step and the like, can potentially be performed in an erroneous manner, and result in the assembly of a cable that does not satisfy specified or specifiable quality requirements.

Examples of such quality requirements include inadequately stripped conductor ends, individual strands that have missed the desired opening of an end cap (e.g., a plug contact, a wire end ferrule or the like), crookedly or insufficiently tightly crimped plug connectors, etc.

An assembled cable that does not satisfy this type of quality requirement is generally referred to as a bad cable, and as a rule disposed of as a reject. Accordingly, an assembled cable that satisfies the quality requirement is generally referred to as a good cable. Cable processing devices are increasingly equipped with quality monitoring systems, which monitor various process steps, e.g., stripping and crimping, and can detect such bad cables. To this end, for example, a quality monitoring system can observe that the stripping process and/or crimping process for an item to be assembled is taking place incorrectly, and thereupon make an assessment to the effect that the currently output cable is a bad cable.

A conventional approach is described in the following: If the quality monitoring system detects a bad cable, steps are taken to discernibly mark the bad cable for an operator. For example, if a contact is incorrectly crimped, steps are taken to sever this contact again. Given an incorrectly stripped conductor end, for example, steps are alternatively taken to not crimp a contact.

Even though a flawless cable can be automatedly produced as a replacement for such a bad cable, the bad cable still gets into the cable tray, and must be sorted out by the operator. If the operator fails to notice a bad cable, this bad cable remains part of the cable batch.

Demand exists for a cable processing device in which the process for providing a flawless cable batch has been improved. The object is achieved by a cable processing device according to claim 1. Advantageous further developments are indicated in the dependent claims. It goes without saying that individual embodiments, aspects and/or features described herein can be combined with each other or correspondingly omitted where appropriate.

SUMMARY OF THE INVENTION

One aspect involves providing a cable processing device. The cable processing device comprises at least one processing unit for assembling a cable. The cable processing device also comprises a sorting unit that can be actuated with a selection signal for outputting a cable received from the processing unit at least on a first side or on a second side according to the selection signal.

For example, a processing unit or assembly unit is provided in the form of a stripping unit, a crimping unit or the like, but is not limited thereto. The selection signal is externally generated, for example, or the selection signal is generated internally by a suitable component of the cable processing device. The received cable is typically output according to the selection signal on either the first side or on the second side. It is especially preferred that the sorting unit always receive precisely one cable, typically an assembled cable, from the processing unit, whereupon the selection for this received cable takes place according to the selection signal. After selection is complete, the sorting unit receives the next single cable from the processing unit, whereupon the selection takes place for this received cable, etc.

For example, the selection that takes place by actuating the sorting unit with the selection signal ensures that good cables are always output on the one side (e.g., always on the first side) and bad cables are always output on the other side (e.g., always on the second side). This can simplify the provision of a flawless cable batch (a cable batch that contains only good cables).

In embodiments, the sorting unit is a multiple trough, which can be rotated around a rotational axis. The rotational axis runs roughly parallel to the cable axis of the received cable. Rotation around the rotation axis takes place according to the selection signal.

The sorting process can be accelerated with a selectively rotatable multiple trough. In this way, the sorting process itself can be easily and safely performed.

In embodiments, the multiple trough comprises two or more trough chambers. According to an advantageous configuration, the multiple through has three through chambers of roughly the same size. Trough chambers of roughly the same size have about the same volume. The rotatable mounting and trough chambers of roughly the same size, in particular three through chambers of roughly the same size, can yield the advantage of enabling a central mounting in the center of gravity, which reduces imbalances, etc.

In embodiments, the cable processing device further comprises a selection unit. The selection unit is set up to output the selection signal to the sorting unit, specifically independently of a detected assembly quality of the cable. For example, assembly quality as used herein involves a differentiation into good cables and bad cables, as explained above. However, it is also possible to consider intermediate qualities, and define one or several thresholds, as a function of which the selection signal is generated.

In a further development of this embodiment, the cable processing device can comprise a detection unit for detection purposes. This detection unit is set up to detect the assembly quality of the cable.

One common example for a detection unit involves a monitoring unit for the crimping power integrated into the crimping unit mentioned above. The monitoring unit is set up to use a force sensor for recording the power progression during a crimping process (a process of pressing the stripped cable end with the contact) performed by means of the crimping unit, and compare it with a desired progression. The comparison reveals process errors, e.g., missing braids in the contact.

In another example, an image acquisition unit (e.g., a digital camera) and an image evaluation unit are provided as the detection unit, wherein the image acquisition unit transmits an image of a representative area of an assembled cable acquired continuously or in defined or definable time intervals to the image evaluation unit. For example, the image evaluation unit runs an image evaluation software, which evaluates or detects the assembly quality of the underlying cable based upon the transmitted image.

In a further development of this embodiment, the production quality of the cable with respect to the cable processing device involves a sufficient quality of the cable, at which the cable is classified as a good cable, and further involves an insufficient quality of the cable, at which the cable is classified as a bad cable. It can here be provided that a good cable receiving unit be arranged on the first side, and a bad cable receiving unit be arranged on the second side.

Understood by a receiving unit as used herein is a component or element or a plurality of components set up to receive a good cable or a bad cable, and possibly store them for a specific period of time. For example, the good cable receiving unit has a good cable removal trough. The configuration of the good cable removal trough allows an operator (or also an automatic removal unit, for example a removal robot) to remove the good cable(s) contained in the good cable removal trough.

It can be provided that the good cable receiving unit comprise a good cable deposit trough as well as the described good cable removal trough. The good cable deposit trough is set up to receive good cables of a plurality of cables contained in a cable batch. In this context, it can also be provided that the good cable deposit trough be configured to transfer the plurality of cables into the good cable removal trough when the quantity of the plurality of cables corresponds to the size of the cable batch. It is then possible for the good cable removal trough to assume precisely two states: It is either empty, or the quantity of good cables available in the good cable removal trough corresponds precisely to a cable batch.

It is possible that the good cable deposit trough be designed so that it can be tilted and/or pivoted relative to the removal trough in such a way that the plurality of cables slides into the good cable removal trough during the transfer. This provides an especially simple option for transferring cables from the good cable deposit trough into the good cable removal trough. Tilting or pivoting preferably takes place automatically. Tilting or pivoting especially preferably takes place via the automatic actuation of a pneumatic actuator.

Similarly to the side for good cables, in embodiments, the bad cable receiving unit comprises a bad cable removal trough. The configuration of the bad cable removal trough allows an operator (or also an automatic removal unit, for example a removal robot) to remove the bad cable(s) contained in the bad cable removal trough.

In embodiments, the good cable removal trough is designed in such a way as to comprise a movable part and an immovable part. The movable part can be longitudinally displaced. In particular, the movable part can be automatically longitudinally displaced. The movable part can preferably be pneumatically longitudinally displaced.

In embodiments, the bad cable removal trough is alternatively or additionally designed in such a way as to comprise a movable part and an immovable part. The movable part can be longitudinally displaced. In particular, the movable part can be automatically longitudinally displaced. The movable part can preferably be pneumatically longitudinally displaced.

In embodiments, the cable processing device further has a conveyor belt for transferring the cable from the at least one processing unit into the sorting unit.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 shows a top view of the cable processing device according to the embodiment;

FIG. 4 shows a schematic perspective view of a cable tray of the cable processing device according to the embodiment; and FIG. 5 shows a schematic perspective view of a cable tray from FIG. 4 viewed from another perspective.

DETAILED DESCRIPTION OF PREFERRED EMBODIMENTS

In the following description of embodiments, the same or similar elements are marked with the same reference numbers. They will not be repeatedly described.

Figure 1:
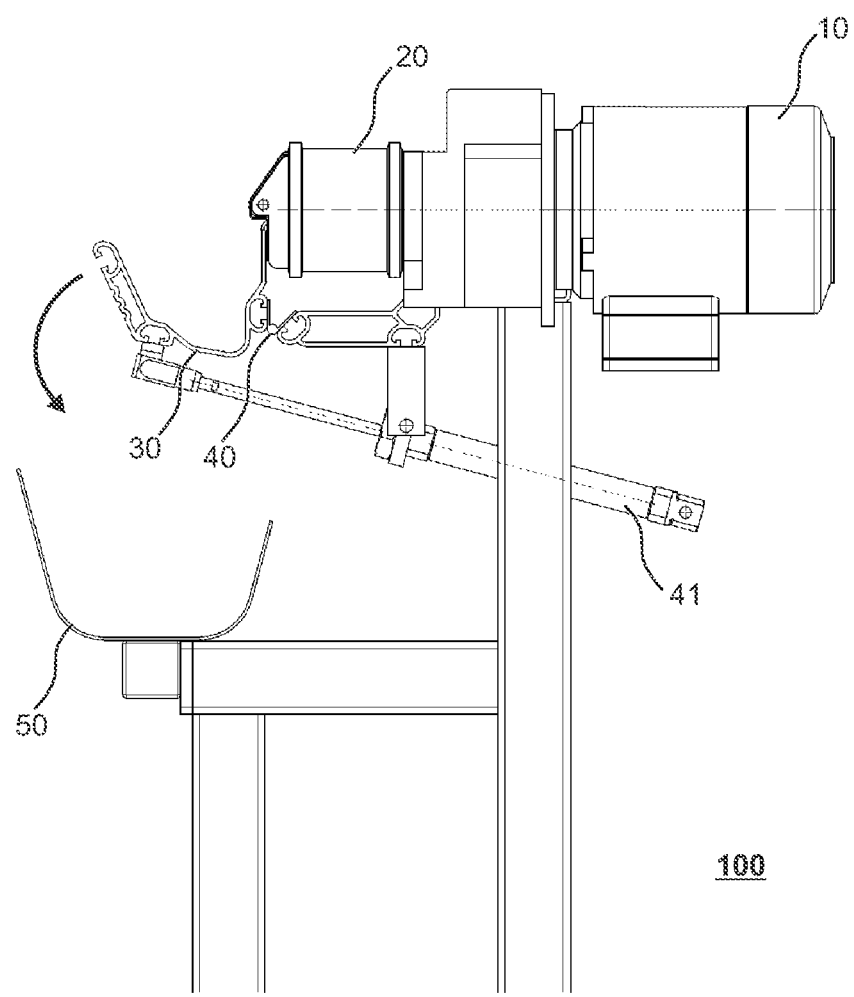
FIG. 1 shows a schematic side sectional view of a conventional cable processing device for explaining the technical principles.

FIG. 1 shows a schematic side sectional view of a conventional cable processing device 100. The cable processing device 100 has a conveyor belt 20, which is driven by a drive motor 10, and on which assembled cables from one or several processing stations of the cable processing device are transported in the direction of a deposit trough 30. The deposit trough 30 can be pivoted by means of an actuatable pivot cylinder 41 around a pivot axis 40, as denoted by the arrow. Good cables contained in the deposit trough at a specific point in time, but also bad cables (not shown), drop or slide into the removal trough 50 during a pivoting motion and can there be removed.

In cable processing machines like the described "pivoting type" conventional cable processing device 100 depicted on FIG. 1, the intermediate storage formed by the deposit trough 30 makes it possible to gather a predetermined or determinable number of completely processed cables. Once the number has been reached, a cable batch or production batch is complete. The described pivoting motion of the deposit trough 30 transfers the produced cable batch into the removal trough 50 automatically or after an acknowledgment by the operator, for example where it can be removed by hand, while the cable processing device 10 produces the next production batch and intermediately stores the cables belonging to this next production batch in the deposit trough 30, which has been pivoted upward once again.

The conveyor belt 20 ensures that the cables remain stretched during transportation into the cable processing device 100 and during the processing of the trailing end (downstream end) of the cable. If this trailing end of the cable is allowed to fall next to the conveyor belt, its own weight combined with the transport movement of the conveyor belt causes it to slide off the conveyor belt 20 sideways, and it falls into the deposit trough 30.

Figure 2:
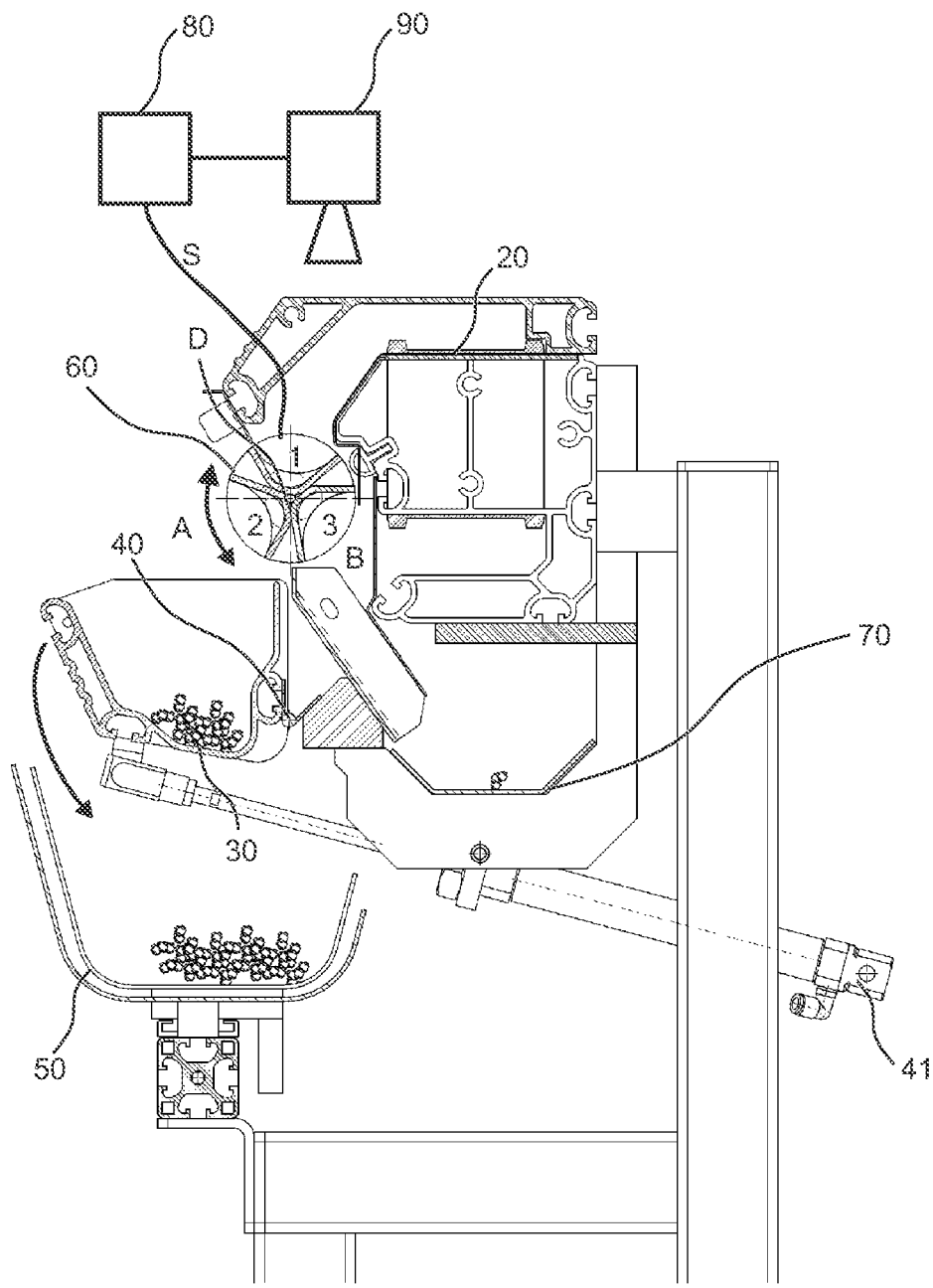
FIG. 2 shows a schematic side sectional view of a cable processing device according to an embodiment.

FIG. 2 shows a side sectional view similar to FIG. 1 of a cable processing device 100 according to an embodiment of the present disclosure. The cable processing device 100 according to the embodiment once again has a conveyor belt 20, which is moved by a drive motor (not shown). A deposit trough 30 can be pivoted around a pivot axis 40 by means of a pneumatically activated pivot cylinder 41 roughly along the direction of the arrow on the deposit trough 30, so that cables located in the deposit trough slide into a removal trough 50.

In addition to the cable processing device 100 from FIG. 1, the cable processing device 100 according to the embodiment on FIG. 2 has a sorting unit 60, which can be turned around a rotational axis D roughly parallel to the cable axis in pulses or sections based on a selection signal. In the exemplary embodiment, the sorting unit 60 has a first trough chamber 1, a second trough chamber 2 and a third trough chamber 3, which are roughly identical in size (i.e., designed with roughly the same volume) and separated from each other by partitions. The partitions produce a division into roughly 120° intervals.

A produced (assembled) cable gets from the conveyor belt 20 into a trough of the sorting unit 60. The sorting unit 60 receives a command from a machine controller (e.g., a selection unit 80) to turn either approx. 120° clockwise or approx. 120° counterclockwise around the rotational axis D. For example, if the cable has fallen into the trough chamber 1 on FIG. 2, a counterclockwise rotational movement by approx. 120° would put it where the trough chamber 2 is depicted on FIG. 2. Accordingly, a clockwise rotational movement by approx. 120° would put the cable where the trough chamber 3 is shown on FIG. 2.

During a counterclockwise rotation, the cable correspondingly falls or slides into the deposit trough 30, which is located on one side A relative to the sorting unit 60. During a clockwise rotation, the cable falls or slides into an additional deposit trough 70 located on the opposite side B.

In the configuration according to the embodiment on FIG. 2, the deposit trough 30 on side A serves as a good cable deposit trough, while the deposit trough 70 on side B serves as a bad cable deposit trough.

Once the batch size in the good cable deposit trough 30 has been reached, the good cable deposit trough 30 is made to pivot around the pivot axis by correspondingly actuating the pneumatic cylinder 41, so that the cable batch is emptied into the good cable removal trough 50. After a subsequently upward pivoting, the cable processing device 100 can produce the next batch. The bad cables correspondingly land in the bad cable deposit trough 70. If there is still a batch in the good cable removal trough 50 after the batch size has been reached, the machine stops so that an operator can remove the cables.

Due to the configuration of the sorting unit 60 with three trough chambers 1, 2, 3 depicted on FIG. 2, the sorting unit 60 does not have to turn back after the cable has been transferred on side A or side B, but can instead receive the next cable directly in the trough chamber that then faces the conveyor belt. As a result, the sorting process does not diminish the production rate of the machine over time.

In the exemplary embodiment shown on FIG. 2, the selection unit 80 is directly connected with the sorting unit 60. However, the present disclosure is not limited thereto, and there can also be an indirect connection between these elements, for example by way of an interspersed machine controller (not depicted). In addition, it is also possible for the selection unit 80 to be part of such a machine controller.

At a selection time, the selection unit 80 outputs a selection signal S to the sorting unit 60, which corresponds to an instruction to turn the sorting unit 60 either in the direction of side A or in the direction of side B. For example, the selection time is a clocked, recurring point in time in the processing cycle of the cable processing device 100. The clock can be fixed or also variable. For example, a variable clock can be established in a case-dependent manner by detecting that the receiving process of a received cable is completed in the respective trough chamber facing the conveyor belt 20.

On FIG. 2, the selection unit 80 is also connected with a detection unit 90. For example, the detection unit 90 has a digital camera or the like to capture an image of the received cable, as well as an option for processing an image captured by the digital camera. It is also common for the detection unit 90 to comprise a force sensor (not depicted) for monitoring the crimping force, wherein the detection unit 90 is set up to use the force sensor to compare a force progression while performing a crimping process with a desired progression, and to transmit the comparison or comparison result to the selection unit 80.

The detection unit 90 or the selection unit 80 connected therewith detects whether the cable to be received, which is received next in the trough chamber facing the conveyor belt 20, represents a good cable or bad cable. Alternatively, the detection unit 90 or the selection unit 80 connected therewith detects whether the received cable, which was received in the trough chamber facing the conveyor belt 20, represents a good cable or bad cable. The selection signal S is generated based on the result of the detection.

Shown for purposes of explanation in the top view on FIG. 3 is a top view of the cable processing device 100. In order to assemble the cable, which is drawn in along a cable infeed axis R and transported by a cable feeder 106 through the processing stations, the cable processing device 100 has a first crimping press 101, a second crimping press 102, a blade head 105 for stripping, a first pivot unit 103 and a second pivot unit 104. A good cable receiving device 31, for example which includes the good cable deposit trough 30, is visible on the right side on FIG. 3. For example, details about the basic function of the cable processing device 10 are described in publication EP 2 442 413 A1, which is incorporated herein by way of reference.

FIG. 4 shows a perspective view of the cable tray of the cable processing device according to the embodiment, while FIG. 5 shows a schematic, perspective view of the cable tray from FIG. 4 viewed from another perspective.

As evident from FIG. 4, the good cable receiving device 31 comprises a good cable removal trough 50, which has a movable part 50a and an immovable part 50b. For example, the movable part 50a of the two-part good cable removal trough 50 can be longitudinally displaceable by means of a pneumatic cylinder (not depicted), so that short cables can be transported out of the difficultly accessible part of the machine under a protective cover, and removed even with the machine running. Even if not shown, this principle can basically also be applied to the bad cable removal trough 70.

As evident from FIG. 5, the sorting unit 60 in the embodiment is an elongated body, which as a whole can be turned around the rotational axis D. The head of the pivot cylinder 41 is secured to the good cable deposit trough 30 in such way that the good cable deposit trough 30 outputs the good cable contained in the pivot cylinder 41 into the good cable removal trough 50 during a pivoting motion by means of the pivot cylinder 41.

Even though embodiments of the invention were described above, the invention is not limited to the described combination of features. The competent person will recognize that other feature combinations can make sense depending on the intended purpose, and that several features can be modified or omitted where appropriate.

Although only a few embodiments of the present invention have been shown and described, it is to be understood that many changes and modifications may be made thereunto without departing from the spirit and scope of the invention.

What is claimed is:

1. A cable processing device, comprising:
   at least one processing unit for assembling a cable;
   a sorting unit that is actuated with a selection signal to output the cable received from the processing unit at least on a first side or on a second side according to the selection signal wherein the sorting unit is a multiple trough, which can turn around a rotational axis according to the selection signal, wherein the rotational axis runs roughly parallel to a cable axis of the received cable; and
   a selection unit for outputting the selection signal to the sorting unit as a function of a detected assembly quality of the cable;
   wherein the assembly quality of the cable involves a sufficient quality of the cable, at which the cable is classified as a good cable, and an insufficient quality of the cable, at which the cable is classified as a bad cable;
   wherein a good cable receiving unit is arranged on the first side, and a bad cable receiving unit is arranged on the second side; and
   wherein the good cable receiving unit comprises a good cable removal trough and a good cable deposit trough for receiving good cables of a plurality of cables contained in a cable batch, as well as the good cable removal trough.

2. The cable processing device according to claim 1, wherein the multiple trough comprises two or more trough chambers of roughly the same size.

3. The cable processing device according to claim 1, which further comprises a detection unit for detecting the assembly quality of the cable.

4. The cable processing device according to claim 1,
   wherein the good cable deposit trough is configured to transfer the plurality of cables into the good cable removal trough when the quantity of the plurality of cables corresponds to the size of the cable batch; and
   wherein the good cable deposit trough is designed so that it can be tilted and/or pivoted in particular relative to the removal trough, in particular designed so that it can be automatically and preferably pneumatically tilted and/or pivoted in such a way that the plurality of cables slides into the good cable removal trough during the transfer.

5. The cable processing device according to claim 1, wherein the bad cable receiving unit comprises a bad cable removal trough.

6. The cable processing device according to claim 5, wherein the good cable removal trough and/or the bad cable removal trough each comprise a movable part and an immovable part, wherein the movable part can be longitudinally displaced, in particular automatically and preferably pneumatically longitudinally displaced.

7. The cable processing device according to claim 1, which further comprises a conveyor belt for transferring the cable from the at least one processing unit into the sorting unit.

8. A cable processing device, comprising:
   at least one processing unit for assembling a cable;
   a sorting unit that is actuated with a selection signal to output the cable received from the processing unit at least on a first side or on a second side according to the selection signal; and a selection unit for outputting the selection signal to the sorting unit as a function of a detected assembly quality of the cable;
   wherein the assembly quality of the cable involves a sufficient quality of the cable, at which the cable is classified as a good cable, and an insufficient quality of the cable, at which the cable is classified as a bad cable;
   wherein a good cable receiving unit is arranged on the first side, and a bad cable receiving unit is arranged on the second side;
   wherein the good cable receiving unit comprises a good cable removal trough; and
   wherein the good cable receiving unit comprises a good cable deposit trough for receiving good cables of a plurality of cables contained in a cable batch, as well as the good cable removal trough.

9. A cable processing device, comprising:
   at least one processing unit for assembling a cable;
   a sorting unit that is actuated with a selection signal to output the cable received from the processing unit at least on a first side or on a second side according to the selection signal; and
   a selection unit for outputting the selection signal to the sorting unit as a function of a detected assembly quality of the cable;
   wherein the assembly quality of the cable involves a sufficient quality of the cable, at which the cable is classified as a good cable, and an insufficient quality of the cable, at which the cable is classified as a bad cable;
   wherein a good cable receiving unit is arranged on the first side, and a bad cable receiving unit is arranged on the second side;
   wherein the good cable receiving unit comprises a good cable removal trough and the bad cable receiving unit comprises a bad cable removal trough; and
   wherein the good cable removal trough and the bad cable removal trough each comprise a longitudinally-displaceable movable part and an immovable part.

* * * * *